July 9, 1935.   P. SEFTON   2,007,879
METHOD OF TREATING TREES
Filed April 5, 1933
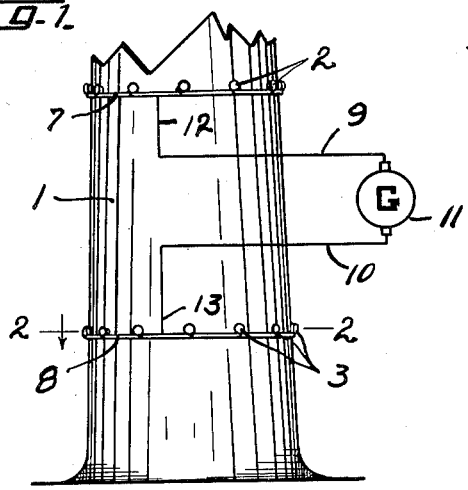
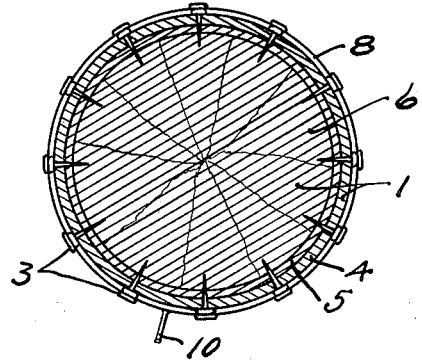
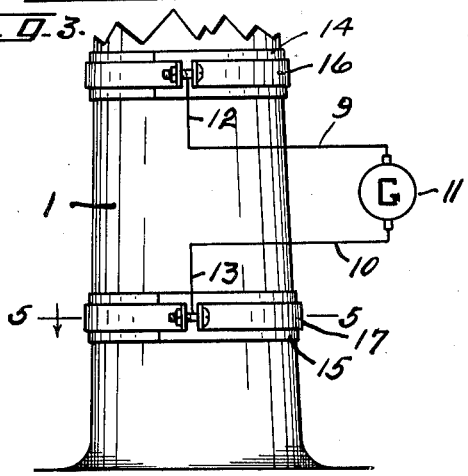
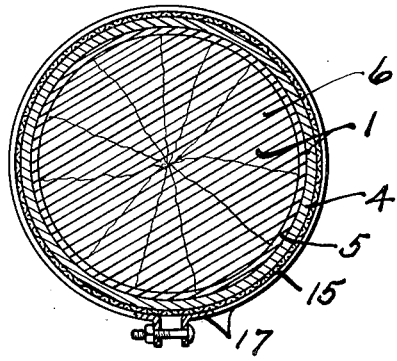
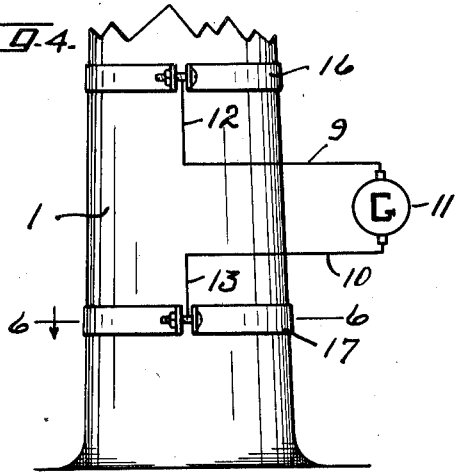
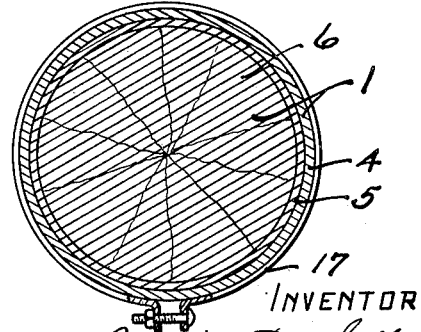

Patented July 9, 1935

2,007,879

UNITED STATES PATENT OFFICE 2,007,879

METHOD OF TREATING TREES

Pennington Sefton, Auburn, N. Y.

Application April 5, 1933, Serial No. 664,548

12 Claims. (Cl. 47—58)

This invention relates to certain new and useful improvements in method of treating trees, shrubs, bushes, vines and the like.

The main object of the invention is to provide a readily available, simple, economic and effective method for killing animals such as borers and the like in trees, and a slight modification of the method renders the apparatus adapted for killing animals, insects, worms, scales, or other species clinging to the surface of the bark of the tree and for the purposes of this application, the word "animal" as used herein is deemed to include all such species as infect trees and the like as hereinafter defined.

Other objects and advantages relate to the details of the method and apparatus, all as will more fully appear from the following description taken in connection with the accompanying drawing in which:—

Figure 1 is an elevation of the portion of the tree illustrating the application of the apparatus of this invention thereto.

Figure 2 is a cross section taken on line 2—2, Figure 1.

Figures 3 and 4 are views similar to Figure 1 illustrating slightly modified forms that the apparatus may take.

Figures 5 and 6 are sections taken on lines 5—5 and 6—6 of Figures 3 and 4 respectively.

It has been discovered that although the bark of a tree or the like in the absence of foreign moisture constitutes a practically infinite resistance to the passage of current therethrough over even a short distance, the sap-conveying portions of the tree afford only a comparatively low resistance to the passage of such current, and that if an electric current of predetermined value is passed through the sap-conveying portions of the tree for a brief time, borers or similar animals which exist within the tree will be killed. This discovery may be utilized in various ways and by differing forms of apparatus to effect the result desired, and for the purpose of illustration, I have shown in Figures 1 and 2, a perhaps preferred form of this apparatus for killing borers or other animals within the tree.

Although the expression "sap-conveying portions of the tree", may not be susceptible of specific dictionary definition, the expression as used in the specification and claims hereof is deemed to define all portions of the tree within the enclosing bark, including the wood of the tree, and the overlying cambium layer which are maintained in moistened condition.

A section of a tree is shown at 1, and for the purpose of causing an electric current to flow through a predetermined length of the tree, spaced contacts are provided constituting a very low resistance path for carrying current to the sap-conveying portions of the tree. A simple and effective means for accomplishing this purpose consists in driving small nails or tacks through the bark of the tree and into the cambium layer preferably extending through the cambium layer and just pricking or slightly penetrating the wood.

As shown in Figures 1 and 2, an upper series of nails or tacks 2 are driven into the tree in a circumferential row. These nails may be spaced apart a desired distance, but effective results are obtained when they are spaced apart a distance of say three or four inches.

A similar lower row of tacks or nails 3 is provided surrounding the tree and spaced a distance from the upper row 2 determined by the vertical length of the tree through which it is desired to pass current. The resistance to the passage of an electric current through the sap-conveying portions of the tree varies in accordance with the spaced distance of these rows of nails but not proportionally. In other words, when these rows of nails are spaced apart a distance of four feet, the resistance to the passage of current between them is somewhat larger than when the rows of nails are spaced apart a distance of one foot but in a much lower ratio than the proportional ratio of four to one. These nails 2 and 3 pass through the bark 4 of the tree and at least extend into the cambium layer 5, but preferably, they extend through the cambium layer and penetrate slightly into the wood 6.

It is found that instead of using rows of nails 2 and 3, effective results can be obtained by the use of a single nail 2 and a single nail 3, but the resistance of the tree to the passage of an electric current between the nails or contacts decreases at least up to a certain point as the number of nails or contacts in each row is increased. For illustration, with rows of nails 2 and 3 spaced apart vertically of the tree a distance of about four feet and with seven nails in each row, the resistance to the passage of an electric current through a selected tree was found to be as low as about 28,000 ohms. Of course, the resistance of the tree will vary in accordance with sap flow and during periods of increased sap flow the resistance may be substantially lower than that named for the experiment. In other words, although one upper contact 2 and one lower contact 3 can be used, it is preferable and more effective to use a series of these contacts or nails, the nails or contacts of each series being electrically connected as, for instance, in parallel by wires 7 and 8 respectively.

It is found that when a voltage of substantially 1800 volts is applied to the conductors 9 and 10 which have their terminals connected respectively to the wires 7 and 8, that current will flow in the circuit so formed utilizing the sap-conveying portions of the tree as a portion of the conductors and that borers or other animals existing in the tree are killed.

The conductors 9 and 10 may be connected to any suitable source of electric current of desired voltage, and although 1800 volts is herein described as effective, it has been found that somewhat lower voltages as well as higher can be used to effect the desired result. For instance, conductors 9 and 10 may be connected to either an alternating or a direct current generator indicated at 11, or as will be readily apparent, the ordinary lighting circuit if available may be readily utilized by incorporating in its output a step-up transformer capable of raising the voltage to the desired extent. However, it is believed that for the purpose at hand, alternating current is much more effective than direct current of like voltage and its use is therefore preferable.

Obviously, such a transformer may be used in connection with an alternating current generator to produce a required voltage from a generator designed to have an output of considerably less voltage. In the use of direct current, it would be necessary to utilize a generator capable of producing the required voltage.

In Figures 3 and 5, a modified form of apparatus is shown in which different means is provided for producing a low resistance path from the terminals 12 and 13 of the conductors 9 and 10 to the sap-conveying portions of the tree. This form of the invention is based upon the discovery that if the bark is thoroughly dampened that the absorbed water will constitute a comparatively low resistance path through the bark to the sap-conveying portions of the tree and for that purpose, the tree is wrapped at spaced portions with circumferential layers of cotton 14 and 15 respectively. These layers are held in place by metallic bands such as copper bands 16 and 17 respectively clamped tightly about the cotton layers to maintain them in place and in intimate contact with the underlying portions of the bark. These cotton layers 14 and 15 are thoroughly dampened and allowed to stand until the underlying portion of the bark has become quite thoroughly dampened or saturated with the water, sufficient water being absorbed to produce a low resistance path through the bark.

That the dampening of the bark produces this result in substantial proportion to the amount of water absorbed is readily shown by the fact that when the water is first applied to the bark as through the medium of the cotton layer, the resistance to the passage of an electric current between the terminals 12 and 13 which are electrically connected to the clamping bands 16 and 17 is quite high, but as the bark absorbs water, the resistance gradually decreases and, therefore, for effective results with this apparatus, it is desirable to apply the water to the bark for a period of time sufficient to dampen the bark to an extent capable of reducing its resistance to a desired degree. The result effected by this apparatus is substantially the same as by the apparatus of Figure 1 although it is perhaps less preferable as the resistance seems at all times to be slightly higher with the apparatus of Figure 3.

In the use of the apparatus of Figure 3, care should be taken to prevent the water from dampening the surface of the bark between the layers 14 and 15 of cotton because in the latter case, it is found that if the entire bark between the layers of cotton becomes dampened, the layer of water on the surface of the bark or absorbed therein, constitutes a comparatively low resistance conductor and the current or at least all of the current will not flow through the sap-conveying portions of the wood.

In Figures 4 and 6, a further modified form of apparatus is shown which differs from Figure 3 in the omission of the layers 14 and 15 of cotton and the conductor bands 16 and 17 are clamped tightly about the bark of the tree. In the use of this apparatus, the bark underneath or contiguous to the conductor clamps 16 and 17 is thoroughly dampened in any suitable manner as by pouring or placing water thereon or in a position to be absorbed thereby. This apparatus has the disadvantage over Figure 3 in that it is somewhat more difficult to dampen the portions of the bark underneath the clamp in order to provide a comparatively low resistance path to the sap-conveying portions of the wood.

Any one of the structures shown in the several figures may be readily utilized for the killing of animals clinging to or positioned on the surface of the bark and in order to effect this result, it is only necessary to dampen the section of the bark between the spaced contacts as in Figure 1, the section of the bark between the nails 2 and 3, and in Figures 3 and 5, the section of the bark between the clamps 16 and 17. The layer of water on the surface of the bark between the contacts provides a comparatively low resistance path for current flowing between the terminals 12 and 13, and it is found that any animals existing on the surface of the bark are killed by the flow of current along the surface of the bark due to the moisture thereon, which constitutes a comparatively low resistance conductor. For this external flow of current along the surface of the bark, the structure of Fig. 3 is perhaps preferable.

The word "tree" as used in the claims hereof is for the purpose of simplicity, deemed to include any tree, bush, shrub, vine or the like which may contain borers or other animals, or upon the surface of which animals may cling or exist, and although I have shown and described specific structures as illustrative of embodiments of the apparatus, I do not desire to restrict myself to the exact details of the method or to any particular apparatus except as the same may be specifically set forth in the claims hereto appended.

I claim:

1. The method of treating trees to kill borers and the like comprising producing spaced low resistance paths for electric current through the bark of the tree to the sap-conveying portions thereof, and then passing an electric current at will through said low resistance paths and through the sap-conveying portions of the tree.

2. The method of treating trees to kill borers and the like comprising producing spaced low resistance paths for the electric current through the bark of the tree to the sap-conveying portions thereof, maintaining a potential at will between said low resistance paths of such value as to cause current to flow through sap-conveying portions of the tree separating said contacts and of sufficient magnitude to kill animals therein.

3. The method of treating trees to kill borers and the like comprising producing spaced low resistance paths for the electric current through the bark of the tree to the sap-conveying portions thereof by inserting electrical contacts extending through the bark of the tree, and maintaining a potential at will between said contacts of such magnitude as to cause current to flow through the portions of the tree separating said contacts.

4. The method of treating trees to kill borers and the like comprising producing spaced low resistance paths for the electric current through the bark of the tree to the sap-conveying portions thereof by dampening spaced sections of the bark and then maintaining a potential at will between said spaced sections of such magnitude as to cause current to flow through the sap-conveying portions of the tree between said dampened sections.

5. The method of treating trees to kill borers and the like comprising inserting contacts through the bark of the tree extending at least into the cambium layer thereof, maintaining a potential at will between said contacts of such value as to cause current to flow through the sap-conveying portions of the tree separating said contacts and of sufficient magnitude to kill animals therein.

6. The method of treating trees to kill borers and the like comprising providing a series of electrically connected contacts through the bark of the tree extending at least into the cambium layer thereof, providing a second series of electrically connected contacts through the bark of the tree extending at least into the cambium layer thereof and spaced from the first series of contacts, and passing an electric current between the first and second series of contacts.

7. The method of treating trees to kill borers and the like comprising inserting a series of electrically connected contacts through the bark of the tree extending at least into the cambium layer thereof, inserting a second series of electrically connected contacts through the bark of the tree extending at least into the cambium layer thereof and spaced from the first series of contacts, and maintaining a potential between the separate series of contacts of such magnitude as to cause current to flow through the sap-conveying portions of the tree.

8. The method of treating trees to kill borers and the like comprising, rendering spaced portions of the bark of the tree conductive to an electrical current, maintaining a potential difference between said conductive portions of bark to cause an electric current to flow therethrough and through the sap-conveying portions of the tree separating said conductive bark portions, sufficient in magnitude to kill animals therein.

9. The method of treating trees to kill borers and the like comprising, moistening spaced portions of the bark of the tree to render said portions conductive to an electric current, maintaining a potential difference between said moistened portions to cause an electric current to flow therethrough and through the sap-conveying portions of the tree separating said moistened portions, sufficient in magnitude to kill animals therein.

10. The method of treating trees to kill borers and the like comprising providing spaced portions of the bark of the tree with a moisture-absorbing material, maintaining a potential difference between said portions, moistening said material until the bark in contact therewith is rendered conducting to permit the flow of an electric current through said spaced portions of the bark and through the sap-conveying portions, of sufficient magnitude to kill animals therein.

11. The method of treating trees to kill borers and the like comprising producing a low resistance path through the bark of the tree extending at least to the cambium layer, producing a second low resistance path through the bark of the tree, and extending at least to the cambium layer and spaced from the first path, and finally passing an electric current between said low resistance paths.

12. The method of treating trees to kill borers and the like comprising producing a low resistance path through the bark of the tree extending at least to the cambium layer, producing a second low resistance path through the bark of the tree and extending at least to the cambium layer and spaced from the first path, and finally maintaining a potential between said low resistance paths of magnitude sufficient to cause current to flow through the sap-conveying portions of the tree.

PENNINGTON SEFTON.